Patented Aug. 5, 1924.

1,503,864

UNITED STATES PATENT OFFICE.

CHARLES H. VOGT, OF PHILADELPHIA, PENNSYLVANIA, ASSIGNOR TO F. G. VOGT & SONS, INCORPORATED, OF PHILADELPHIA, PENNSYLVANIA, A CORPORATION OF PENNSYLVANIA.

MEAT PRODUCT AND METHOD OF MAKING THE SAME.

No Drawing.    Application filed July 11, 1921.    Serial No. 483,758.

*To all whom it may concern:*

Be it known that I, CHARLES H. VOGT, a citizen of the United States, residing at Philadelphia, in the county of Philadelphia and State of Pennsylvania, have invented certain new and useful Improvements in Meat Products and Methods of Making the Same, of which the following is a specification.

My invention relates to meat products and the method of making the same, and in such connection it relates more particularly to a "boneless boiled ham" product and to the method of making the same, whereby all parts of the ham may be rendered equally edible, and comprising a product particularly adaptable for slicing purposes in desirable form and shape. Heretofore, in the preparation of boiled hams for the market, the bone and portions of the fat were usually removed, after which the ham was subjected to an ordinary cooking process in molds of suitable shape, which molds usually conformed more or less to the original shape of the ham, and the product when so produced had certain objections in that the hock or shank portion, and also the sinewy part at the pelvic end, were considerably less desirable than the central portions of the ham, and the consumer usually objected to purchasing these end portions, compelling the dealer to either dispose of the same at a reduced price or to otherwise get rid of the same at a relative loss.

The object, therefore, of my present invention is to produce a novel form of meat product of the "boneless boiled ham" type in which the end portions of the ham will be rendered more edible and so incorporated in the product that the entire ham may be made equally desirable and thereby readily disposed of to the consumer, thus resulting in considerable economy.

The nature and characteristic features of my invention will be more readily understood from the following description of the preferred method employed and the product resulting therefrom, it being understood that the specific references to the various proportions, periods of time and temperatures mentioned, are those which have been found to be most practical and satisfactory for the purposes intended, at the same time recognizing that the same may be varied without departing from the spirit and scope of my invention.

In carrying out the method of my present invention, the bone and principal portions of the fat are first removed from the ham. The hock or shank, which contains the coarse fibers and a certain amount of sinewy parts which ordinarily render the same less desirable, and also the sinewy parts at the pelvic end of the ham, are then cut off and separated from the main or central and more desirable portion of the ham. It should here be noted that the hock and pelvic portions contain a quantity of gelatinous matter which is useful in a subsequent step of the process, as hereinafter set forth.

The hock and pelvic ends are then ground and chopped, together with a certain quantity of salt and saltpeter, and a sufficient quantity of crushed ice to keep the mass from getting warm during the step of reducing the same to a comminuted condition. In this step of the process, there is used preferably about 2½ pounds of salt, and about ½ pound of saltpeter, to each one hundred pounds of meat, although these proportions may be varied to suit conditions. After the hock and pelvic portions are thus ground and chopped, and the salt and saltpeter have been mixed and incorporated therewith, this portion of the material is then placed in a suitable receptacle and left to cure until needed in a subsequent step of the process.

The central part of the ham, which contains the more desirable portion of the meat, is cut into pieces of approximately 2-inch cubes, any objectionable quantity of fat remaining being first removed therefrom. These more or less cubical pieces of the central part of the ham are then mixed, in the preferable proportion for one hundred pounds of meat, with about 2 pounds of honey, about 2½ pounds of salt, and about ½ pound of saltpeter, the whole being thoroughly agitated in a mixing machine so that the added substance will be completely distributed over the surfaces of the pieces of the central part of the ham, after which the entire mass is placed in a receptacle and is left to cure for a period of about eight to ten days.

After the pieces of the central part of the ham, treated as above, have become sufficiently cured, they are then placed in a mixing machine, together with approximately ten per cent. of the comminuted and cured hock and pelvic portions, and the entire mass is agitated in the mixer until the comminuted hock and pelvic meat is thoroughly distributed over the surfaces of the pieces of the central portion.

The pieces thus covered with the ground and cured meat of the hock and pelvic portions are then packed in a suitable bag preferably of textile material, being so arranged therein as to reduce the voids to a minimum, the whole being sufficiently compacted so that the comminuted hock and pelvic meat will be distributed between the adjacent surfaces of the pieces of the central portion, and will also fill out any incidental voids that may occur.

The product as thus far described is now preferably placed in a smokehouse for a period of from about 35 to 60 minutes and preferably at a temperature of from about 120 to 200 degrees. The material, still contained within the bag, is then placed in a container of desired shape and "boiled" until thoroughly cooked, preferably at a temperature of from about 150 to 200 degrees. The product is now taken from the container and placed under a cold spray for a period of about one-half hour, to remove the excessive heat, and the same is then placed in a refrigerating room of a temperature preferably below 43 degrees, and left to stand for a period of from 15 to 20 hours so that the same will be thoroughly chilled and molded firmly and the gelatin of the hock and pelvic portions will then set and thereby firmly unite the various portions in a solid compact mass suitable for slicing purposes, and presenting a very desirable and acceptable appearance and condition throughout.

It will be seen that there will thereby be produced a novel and desirable form of "boiled ham," all portions of which will be of equal desirability, and which will be found to be quite palatable and more acceptable to the consumer than the boiled ham of the form at present most commonly sold.

Having thus described the nature and characteristic features of my invention, what I claim as new and desire to secure by Letters Patent, is:

1. A cooked meat product comprising relatively large pieces of the central portion of a ham, and comminuted hock and pelvic portions of the ham, all united in a solid compact mass.

2. A cooked meat product comprising relatively large pieces of the central portion of a ham, said pieces being united to each other in a solid compact mass and the incidental voids being filled by means of a binder consisting of the comminuted hock and pelvic portions of the ham.

3. The method of making a meat product which consists in separating the hock and pelvic portions of the meat of a ham from the central portion, grinding said hock and pelvic portions into a comminuted mass, cutting the main central portion of the ham into relatively large pieces, then mixing the pieces of the central portion of the ham with a quantity of the comminuted hock and pelvic portions, then cooking the mass in an assembled shape, and thereafter chilling the same to cause it to become thoroughly set and united in a solid compact mass.

4. The method of making a meat product which consists in separating the hock and pelvic portions of the meat of a ham from the central portion, grinding said hock and pelvic portions into a comminuted mass, cutting the main central portion of the ham into relatively large pieces, then mixing the pieces of the central portion of the ham with a quantity of the comminuted hock and pelvic portions, compacting the same within a bag of textile material, then cooking the mass in an assembled shape, and thereafter chilling the same to cause it to become thoroughly set and united in a solid compact mass.

5. The method of making a meat product which consists in separating the hock and pelvic portions of the meat of a ham from the central portion, grinding said hock and pelvic portions into a comminuted mass and curing the same, cutting the main central portion of the meat of the ham into relatively large pieces and curing the same, then mixing the cured pieces of the central portion of the ham with a quantity of the comminuted and cured hock and pelvic portions, then cooking the mass in an assembled shape, and thereafter chilling the same to cause it to become thoroughly set and united in a solid compact mass.

6. The method of making a meat product which consists in removing the bone and principal portions of the fat from a ham, then separating the hock and pelvice portions of the meat therefrom, grinding the hock and pelvic portions into a comminuted mass and curing the same, cutting the main central portion of the ham into relatively large pieces and curing the same, then mixing the cured pieces of the central portion of the ham with a quantity of the comminuted and cured hock and pelvic portions, then smoking the same, then cooking the same in a container of desired shape, and thereafter chilling the same to cause it to become thoroughly set and united in a solid compact mass.

7. The method of making a meat product which consists in removing the bone and principal portions of the fat from a ham, separating the hock and pelvic portions of the meat therefrom, grinding the hock and pelvic portions into a comminuted mass and curing the same, cutting the main central portion of the ham into relatively large pieces and curing the same, then mixing the cured pieces of the central portion of the ham with a quantity of the comminuted and cured hock and pelvic portions, compacting the same within a bag of textile material, then cooking the same in a container of desired shape, and thereafter chilling the same to cause it to become thoroughly set and united in a solid compact mass.

8. The method of making a meat product which consists in removing the bone and principal portions of the fat from a ham, separating the hock and pelvic portions of the meat therefrom, grinding the hock and pelvic portions into a comminuted mass and curing the same with salt and saltpeter, cutting the main central portion of the ham into relatively large pieces and curing the same with honey, salt and saltpeter, then mixing the cured pieces of the central portion of the ham with a quantity of the comminuted and cured hock and pelvic portions, compacting the same within a bag of textile material, then cooking the same in a container of desired shape, and thereafter chilling the same to cause it to become thoroughly set and united in a solid compact mass.

In testimony whereof, I have hereunto signed my name.

CHARLES H. VOGT.